United States Patent Office

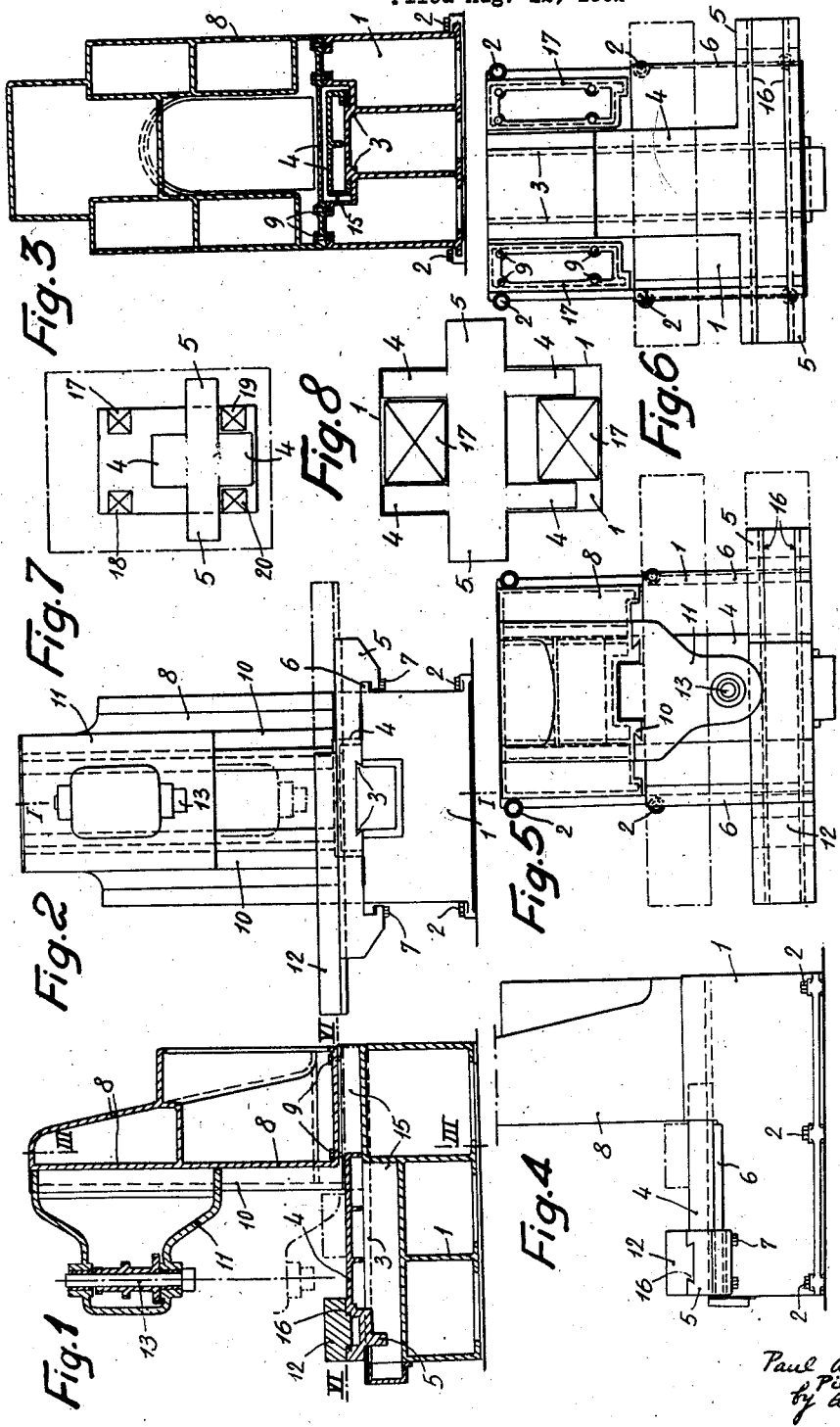

2,824,499
Patented Feb. 25, 1958

2,824,499

MACHINE TOOL

Paul André Gambin, St-Cloud, and Pierre Massot, Paris, France

Application August 12, 1952, Serial No. 303,888

Claims priority, application France August 16, 1951

2 Claims. (Cl. 90—11)

Some machine tools in use at the present time comprise a carriage generally called a bracket, which is capable of moving on a fixed vertical guide carried by the framework of the machine and which supports another carriage generally called transverse; the latter, being capable of moving on a horizontal guide, carries, in turn, a guide which is horizontal and perpendicular on the two other above-mentioned guides, and on which a carriage can be moved, generally called a table, on which the object to be machined is placed.

Such machine tools offer various drawbacks from the point of view of stability and of the necessity of moving vertically the assembly of the three carriages for bringing the tool in contact with the part to be machined.

One of the objects of the present invention is to allow the machining of large and heavy parts in conditions of stability and rigidity better than those commonly found with present machine tools. It also makes it possible to obtain parts of smaller dimensions with higher precision.

An object of the present invention is a machine tool comprising one or more of the following features:

(a) Two out of the three carriages move along fixed guides, perpendicular to each other and carried by the frame of the machine, while the third carriage moves on a guide carried by one of the above mentioned carriages and the direction of which is perpendicular to those of the fixed guides.

(b) One the carriages moving on a fixed guide carries the tool.

(c) The third carriage carries the part to be machined.

(d) The fixed guide carrying the transverse carriage has such a length that in any working position of the latter it rests on parts which are not overhanging the base of the frame.

(e) The transverse carriage offers recesses or notches inside which are the base or bases through which the portion of the frame supporting the tool holder carriage bears against the other portion of the frame which supports the transverse carriage and, through its medium, the table and the part to be machined; the lengths of the recesses or notches, measured in the direction of the fixed guide which supports the transverse carriage, being larger than those of said base or bases, so as to allow the displacement of the transverse carriage and the lengthening of the fixed guide supporting it.

(f) The fixed guide carrying the transverse carriage extends over the whole length of the base of the frame.

(g) For facilitating manufacture and assembly, the frame is in two parts; a base resting on the ground and carrying one of the fixed guides and a so-called vertical support bearing on the base, secured thereto and supporting the other fixed guide.

(h) In horizontal projection, the transverse carriage is inscribed inside a rectangle and comprises one or more notches so arranged that the bearing surfaces of the vertical support on the base are in said notches at least in some positions of operation of the transverse carriage.

(i) The portion of the transverse carriage which supports the third carriage is held at its two ends by the base for instance by engaging plane slides in the base.

(j) The guide length for the third carriage extends over the whole length of the carriage which supports it and is such that whatever may be the working position of this third carriage the latter rests on a part of the supporting carriage supported rigidly by the base.

By way of example only, preferred embodiments of the invention are shown in the appended drawing (the broken lines representing different positions of certain portions of the machine) wherein:

Figure 1 is a sectional contour view of a vertical milling machine according to this invention, taken along line I—I of Figure 2.

Figure 2 is a front elevational view of the milling machine.

Figure 3 is a sectional elevation of the milling machine taken along line III—III of Figure 1.

Figure 4 is a profile view of the machine.

Figure 5 is a top plan view of the milling machine.

Figure 6 is a plan view of the lower portion of the milling machine taken along line VI—VI of Figure 1.

Figures 7 and 8 are top plan views of a second and third form of milling machines according to the present invention with their tables removed.

The milling machine shown in Figures 1 to 6 has a pedestal 1 held down by bolts 2. The general shape of the pedestal 1 is that of a rectangular parallelepiped. This pedestal 1 carries, in its central portion, the guide 3 for the transverse carriage 4, hereinafter described.

On the back portion of the pedestal 1, a vertical support 8 is secured by means of screws 9. As is apparent, particularly from Figures 1 and 3, this support 8 leaves free passage for the transverse carriage 4 in the region 15 and is supported on large bases 17 on the pedestal 1. The support 8 is provided with a vertical guide 10, dovetailed therein, for a carriage 11 which carries the vertical spindle 13 of the milling cutter.

It should be noted that the vertical support 8 may be given all the required height for obtaining a good guiding of the carriage 11, without modifying the height of the table carrying the same and without decreasing the convenience of operation.

The guide 3, which is dovetailed, extends over the whole width of the pedestal 1 and serves as a slide track for a carriage 4, 5. This carriage 4, 5, in horizontal projection, has the shape of a rectangle with notches which partly surround the bases 17 (Fig. 6) for the support 8 on the pedestal 1. In this form of the invention, the shape of the carriage 4, 5 resembles that of a capital T. The central portion of the T, designated by 4 rests directly on the guide 3. The side arms of the T, designated by 5, cover the planed portions 6 of the pedestal 1, so as to prevent toppling or tilting of the carriage 4, 5. When the latter is to be immobilized while working on the part to be machined, the carriage is immobilized not only by the usual locking devices on the guide 3 but also by screws 7 which lock the portions 5 on the portions 6 of the pedestal 1. The rigidity of the assembly of the pedestal 1 and carriage 4, 5 is thus well ensured. Owing to the lengths of the guides 3 and especially to their passage under the support 8, the carriage 4, 5 is never overhung whatever its working position may be. On the portions 5 of the carriage 4, 5 corresponding to the arms of the T there is provided a front guide 16 which extends over the whole length of the portion 5 and on which a table 12 is slidable. The table 12 may be of conventional design and construction and is intended to receive the work-piece to be machined, either directly or through a mounting device appropriate to the work to be effected (circular plate, dividing apparatus, apparatus for cutting helixes, etc.).

As may be seen from the above, owing to the lengths of the guides 3 and 16, and to the width of bearing resulting from the portions 6, the stability of the part to be machined, whatever may be the working positions of the carriages 4, 5 and 12, is ensured. The carriage 4, 5 is never in overhang, and the pedestal 1 (Figure 2) may be given the required width for decreasing or minimizing the overhang of the table 12 without increasing the bulk of the machine.

If, for example, it is desired to bore or drill a hole in a work-piece with the said machine, this is carried out as follows: The operator mounts a countersink on the spindle 13 carried by carriage 11 and the work-piece to be pierced on the table 12 and adjustments are then made so that the axis of the spindle 13 coincides with the axis of the hole to be made in the work-piece. These adjustments can be made by correlated movements of table 12 on carriage 4, 5 and of the said carriage on the framework of the machine.

From the fact that the guides 3 are brought together and the lateral borders of the carriage 4, 5 are maintained in position by the seats 6, which are separated to their maximum extent, the carriage 4, 5 cannot tilt or topple under the effect of successive unequal loads upon it; on the other hand, due to the length of the part 4 of the carriage 4, 5 and the length of the slides 3, the guiding of the carriage 4, 5 is better and more precise. In addition, due to the fact that the part 5 of the carriage 4, 5 has great width, the amplitude of the displacement of the carriage 12, supported by the part 5, is increased.

The presence of the notches between parts 4 and 5 enables an increase in the travel or path of carriage 4, 5 and the accomplishment of the guiding action of guides 3 over a longer distance than would be possible in the absence of such notches.

The milling machine shown in Figure 7 differs from that shown in Figures 1 to 6 by the fact that the support 8 bears on the pedestal 1 on four bases or bearing surfaces 17, 18, 19 and 20 and that the carriage 4, 5 has here the shape of a cross, the two opposite branches of which form the portions 4 of the carriage while the two other branches form the portions 5 of said carriage. In this milling machine, one portion 4 moves between the bearing surfaces 17 and 18 of the support 8 and the other portion 4 moves between the bearing surfaces 19 and 20. There may also be used, for securing the support 8, only two or three of the bearing surfaces 17, 18, 19 and 20. For instance, 17 and 20, or 17 and 19, or 17, 18 and 19, etc.

The milling machine shown in Figure 8 differs from that shown in Figures 1 to 6 in that the support 8 rests on the pedestal 1 by two surfaces 17 and in that the carriage 4, 5 has here the general shape of a capital H in which the transverse portions 5 extend beyond the portions 4. In this form of milling machine, the portions 4 move on both sides of the bearing surfaces 17 of the support 8.

From the various arrangements shown in Figures 6, 7 and 8, that one is selected in a particular instance which best ensures the stability of the tool holder carriage 11 while facilitating access to the tool and to the part being machined.

The present invention is not limited to the examples given above. Thus the tool holder carriage 11 may assume very varied shapes—vertical milling head as in Figure 1; horizontal milling head, universal; variable orientation milling head; mortising head; etc. The milling cutter may be replaced by a grindstone, a drill, etc.

We claim:

1. A machine tool comprising a pedestal, first transverse guideways secured on the pedestal and disposed in the central part of the pedestal, second transverse guideways joined with the pedestal and disposed along the transverse edges of the pedestal, a first carriage of notched, irregular shape forming a central tongue and having reentrant angles of such nature that the width of the full median portion is greater than that of the extremities, which latter are supported on the second transverse guideways while the median part rests on the first transverse guideways, third longitudinal guideways carried by the first carriage, a second carriage resting on the third longitudinal guideways, a bridge-shaped support above the pedestal and attached thereto the arch of which has a length just sufficient to permit passage of the central tongue of the first carriage and the first transverse guideways, fourth guideways perpendicular to the first transverse guideways carrying the first carriage and to the third longitudinal guideways carrying the second carriage, the said fourth guideways being carried by the bridge-shaped support, and a third carriage capable of sliding on the fourth guideways, the second carriage supporting the piece to be worked and the third carriage supporting the tool.

2. A machine tool comprising a pedestal, first transverse guideways secured on the pedestal and disposed in the central part of the pedestal, second transverse guideways joined with the pedestal and disposed along the transverse edges of the pedestal, a first carriage in the form of a T, the branches of which have at their extremities parts which are supported on the lower faces of the second transverse guideways and the central tongue of which rests upon the first transverse guideways, third longitudinal guideways carried by the first carriage, a work-carrying second carriage resting on the third longitudinal guideways, a bridge-shaped support above the pedestal and attached thereto the arch of which has a length just sufficient to permit passage of the central tongue of the first carriage and the first transverse guideways, fourth guideways perpendicular to the first transverse guideways carrying the first carriage and to the third longitudinal guideways carrying the second carriage, the said fourth guideways being carried by the bridge-shaped support and a tool-carrying third carriage capable of sliding on the fourth guideways.

References Cited in the file of this patent

UNITED STATES PATENTS

| | | |
|---|---|---|
| 2,462,997 | Roush | Mar. 1, 1949 |
| 2,577,517 | Gallimore | Dec. 4, 1951 |
| 2,578,113 | Watcher et al. | Dec. 11, 1951 |
| 2,610,550 | Touchman | Sept. 16, 1952 |
| 2,718,819 | Setphan | Sept. 27, 1955 |